United States Patent [19]

Oh et al.

[11] Patent Number: 5,353,376
[45] Date of Patent: Oct. 4, 1994

[54] SYSTEM AND METHOD FOR IMPROVED SPEECH ACQUISITION FOR HANDS-FREE VOICE TELECOMMUNICATION IN A NOISY ENVIRONMENT

[75] Inventors: Sang G. Oh, Richardson; Vishu R. Viswanathan, Dallas, both of Tex.

[73] Assignee: Texas Instruments Incorporated, Dallas, Tex.

[21] Appl. No.: 854,161

[22] Filed: Mar. 20, 1992

[51] Int. Cl.$^5$ .............................................. G10L 5/06
[52] U.S. Cl. ..................................... 395/2.42; 381/41; 381/46
[58] Field of Search .................... 381/41, 46; 395/2.42

[56] References Cited

U.S. PATENT DOCUMENTS 3,781,782 12/1973 Scott et al. ........................... 367/126
4,893,289 1/1990 Greenwood et al. ................ 367/136

OTHER PUBLICATIONS

Claesson et al., "A Multi-DSP Implementation of a Broad-Band Adaptive Beamformer for Use in a Hands-Free Mobile Radio Telephone," IEEE Trans. on Vehicular Tech., vol. 40, No. 1, Feb. 1991, pp. 194–202.
G. Doddington, "Phonetically Sensitive Discriminants for Improved Speech Recognition," Proceedings ICASSP 1989, pp. 556–559.
V. Alvarado, et al., "Experimental Results Showing the Effects of Optimal Spacing Between Elements of a Linear Microphone Array", Proceedings ICASSP 1990, p. 837–840.
M. Goulding, et al., "Speech Enhancement for Mobile Telephony", IEEE Trans. on Vehicular Technology, vol. 39, Nov. 1990, pp. 316–326.
L. Griffiths, et al., "An Alternative Approach to Linearly Constrained Adaptive Beamforming", IEEE Transactions on Antennas and Propagation, vol. AP-30, No. 1, Jan. 1982, pp. 27–34.

*Primary Examiner*—Michael R. Fleming
*Assistant Examiner*—Richard J. Kim
*Attorney, Agent, or Firm*—W. Daniel Swayze; Leo N. Heiting; Richard L. Donaldson

[57] ABSTRACT

Systems and methods for improved speech acquisition are disclosed including a plurality of linearly arrayed sensors to detect spoken input and to output signals in response thereto, a beamformer connected to the sensors to cancel a preselected noise portion of the signals to thereby produce a processed signal, and a speech recognition system to recognize the processed signal and to respond thereto. The beamformer may also include an adaptive filter with enable/disable circuitry for selectively training the adaptive filter a predetermined period of time. A highpass filter may also be used to filter a preselected noise portion of the sensed signals before the signals are forwarded to the beamformer. The speech recognition system may include a speaker independent base which is able to be adapted by a predetermined amount of training by a speaker, and which system includes a voice dialer or a speech coder for telecommunication.

22 Claims, 3 Drawing Sheets

SYSTEM AND METHOD FOR IMPROVED SPEECH ACQUISITION FOR HANDS-FREE VOICE TELECOMMUNICATION IN A NOISY ENVIRONMENT

BACKGROUND OF THE INVENTION

1. Field of the Invention

Without limiting its scope, this invention relates to voice processing and more particularly to a system and method for improved speech acquisition during hands-free voice telecommunication in a noisy background environment.

2. Description of the Related Art

Hands-free cellular telephony requires dialing by voice with a speech recognition system. Even so, it is known that in a noisy vehicular environment such as, for example, an automobile, a speech recognition system performs poorly with a single microphone input unless the microphone is close to the driver's mouth, as is the case of a head-mounted or hand-held (handset) microphone. However, this arrangement is not desirable from a safety, legal or human-factors viewpoint. For example, a driver's reaction time to road events takes significantly longer while using a hand-held cellular phone. Also, safety regulations in many countries prohibit using hand-held cellular telephones in road vehicles while driving.

Accordingly, improvements which overcome any or all of these problems are presently desirable.

SUMMARY OF THE INVENTION

In view of the above problems associated with the related art, it is an object of the present invention to provide a system and method for improved speech acquisition and enhancement to thereby enable more reliable speech recognition in a noisy environment, which is particularly necessary for reliable performance of hands-free voice dialing.

It is another object of the present invention to provide a system and method for improving the speech recognition rate to enhance hands-free telecommunications in a vehicular environment.

It is a further object of the present invention to provide a system and method for improving speech acquisition system to enhance the speech signal quality and thereby cause the output of a speech coder to sound better than that obtained using a single microphone.

These and other objects are accomplished in the systems and methods of the present invention. In a preferred embodiment, enhanced speech acquisition is achieved by mounting a plurality of linearly arrayed sensors in the interior vehicular compartment to detect spoken input and to output signals in response thereto. By taking advantage of the near-field, wideband aspects of such a signal, a beamformer connected to the sensors cancels a significant amount of the noise in the signals in producing a processed target signal. A speech application system, which includes a voice dialer or a speech coder for cellular telecommunication, or both, then receives the processed target signal and responds thereto. The speech recognition system uses a speaker independent algorithm which is able to be adapted by a predetermined amount of training by a speaker and which is able to be adapted to the environmental factors such as noise and reverberation as well as to the special aspects of the speech acquisition system of the present invention. This system adaptation process improves the speech recognition accuracy substantially.

In another embodiment of the present invention, the beamformer includes an adaptive filter with enable/disable circuitry for selectively training the adaptive filter a predetermined period of time. This effectively adapts the speech acquisition system of the present invention to the noise characteristics present when a speaker uses the cellular telephony. This strategy, referred to below as "adapt-and-stop" strategy greatly improves noise cancellation without significant speech signal cancellation and distortion risks of traditional adaptive algorithms. A further embodiment employs an additional highpass filter to filter out a preselected lower frequency band of the sensed signals thereby removing or reducing certain background noise before the signals are forwarded to the beamformer.

These and other features and advantages of the invention will be apparent to those skilled in the art from the following detailed description of a preferred embodiment, taken together with the accompanying drawings, in which:

DESCRIPTION OF THE DRAWINGS

FIG. 3 is a representation of an input signal; and

FIG. 5 is a flowchart of another embodiment of the present invention.

Corresponding numerals and symbols in the different figures refer to corresponding parts unless otherwise indicated.

DETAILED DESCRIPTION OF PREFERRED EMBODIMENTS

While various preferred embodiments described below will use the example of a driver/speaker in an automobile environment, this should in no way limit the scope of the present invention. For example, such invention would be similarly useful in the cockpit of an airplane, the cab of a truck, the cabin of a boat or any noisy environment where hands-free voice communications is desirable. Moreover, it will be understood by those skilled in the art that the improved speech acquisition system and method of the present invention will greatly increase the accuracy of speech recognition for verbal commands to a vehicle.

Figure 1:
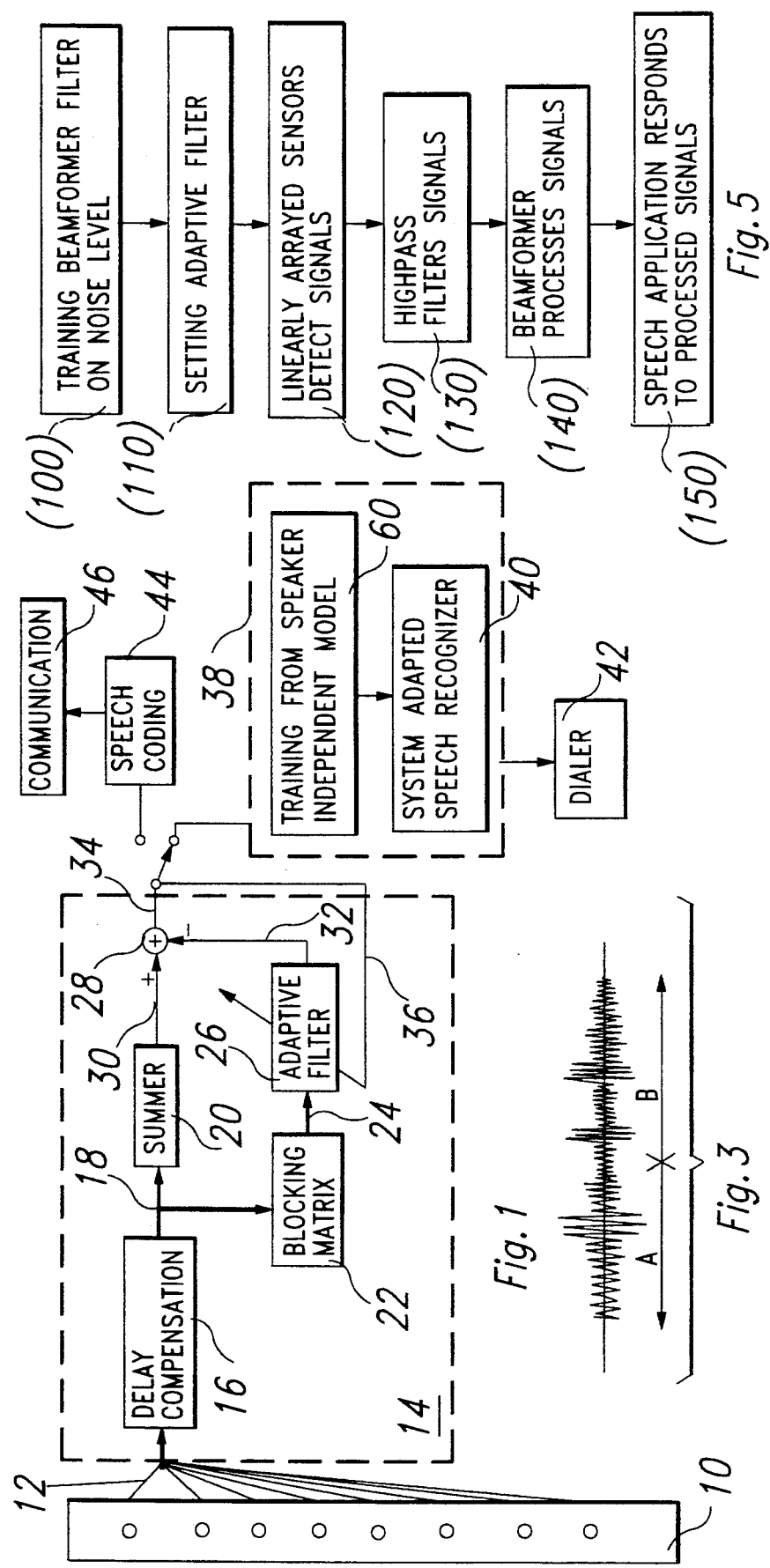
FIG. 1 is a schematic drawing of a preferred embodiment of the present invention.

A preferred embodiment of the present invention's speech acquisition system in a noisy environment is depicted in FIG. 1. This system uses a linear array of sensors 10, preferably microphones, mounted inside a car and produces enhanced speech from the multi-microphone data using beamforming algorithms.

Speech enhancement using a microphone array and beamforming is a multichannel data processing problem. However, if the delays between the speaker (not shown) and microphones 10 are known or can be estimated, they can be compensated to synchronize the target signals from all channels.

In one embodiment of the present invention the time delay for each channel 12 associated with a microphone 10 is computed and compensated, based on the geometry of microphones 10 and the desired target signal. It is assumed the position of the speaker (the driver) is known; the present invention has been effective even when the assumed position is only a reasonable estimate of the true value. Each channel 12 contains the desired target signal and interferences such as noise and jammer (e.g., another talker) signals. Let $y_k(t)$ denote the output at the k-th channel (12) after highpass filtering (highpass filter seen in FIG. 4). Then, $$y_k(t) = s(t - \tau_k) + n_k(t)$$

where s(t) is the target signal, $n_k(t)$ is interference, and $\tau_k$ is time delay between the target and the k-th microphone.

The time delay for each channel signal is computed as $$\hat{\tau}_k = ((x_s - x_k)^2 + (y_s - y_k)^2 + (z_s - z_k)^2)^{\frac{1}{2}}/v$$

where $(x_s, y_s, z_s)$ is the position of the target, $(x_k, y_k, z_k)$ is the position of the k-th microphone (channel) and v is sound velocity. The delay-compensated signal is given by:

$$z_k(t) = y_k(\hat{\tau}_k)$$

Note that the time index t in the above equation is an integer while the delay estimate $$\hat{\tau}_k,$$

in general, is not. Therefore, $z_k(t)$ is computed by interpolation based on the discrete samples available around time $$t - \tau_k.$$

A simple method used to compute the interpolated value for non-integer delays is:

$$y_k(t - \hat{\tau}_k) = \frac{\sum_{i=-p1}^{p2} y_k(\lfloor t - \hat{\tau}_k \rfloor - i) \operatorname{sinc}(\lfloor t - \hat{\tau}_k \rfloor - i)}{\sum_{i=-p1}^{p2} \operatorname{sinc}(\lfloor t - \hat{\tau}_k \rfloor i)}$$

where [.] is the largest integer that is equal to or smaller than the argument, p1 and p2 are lower and upper values of time index to compute the interpolated value, and $\operatorname{sinc}(x) = \sin(x)/x$.

The target signal is synchronized in all the delay-compensated channel data. Output 30 of delay-and-sum beamformer (hereinafter sometimes referred to as "DS-BF") 16,18,20 is just the sum of delay-compensated multi-channel data 18. DS-BF output 30 is given by $$z_{DS}(t) = \sum_{k=1}^{N} z_k(t)/M$$

where M, the number of microphones 10, is used as a scale factor. Because DS-BF output 30 is generated by coherently adding the target signals and incoherently adding the interference signals, it has a higher signal-to-noise ratio (SNR) than the output from any of the individual microphones. Thus, a microphone array is preferred to a single microphone.

Figure 2:
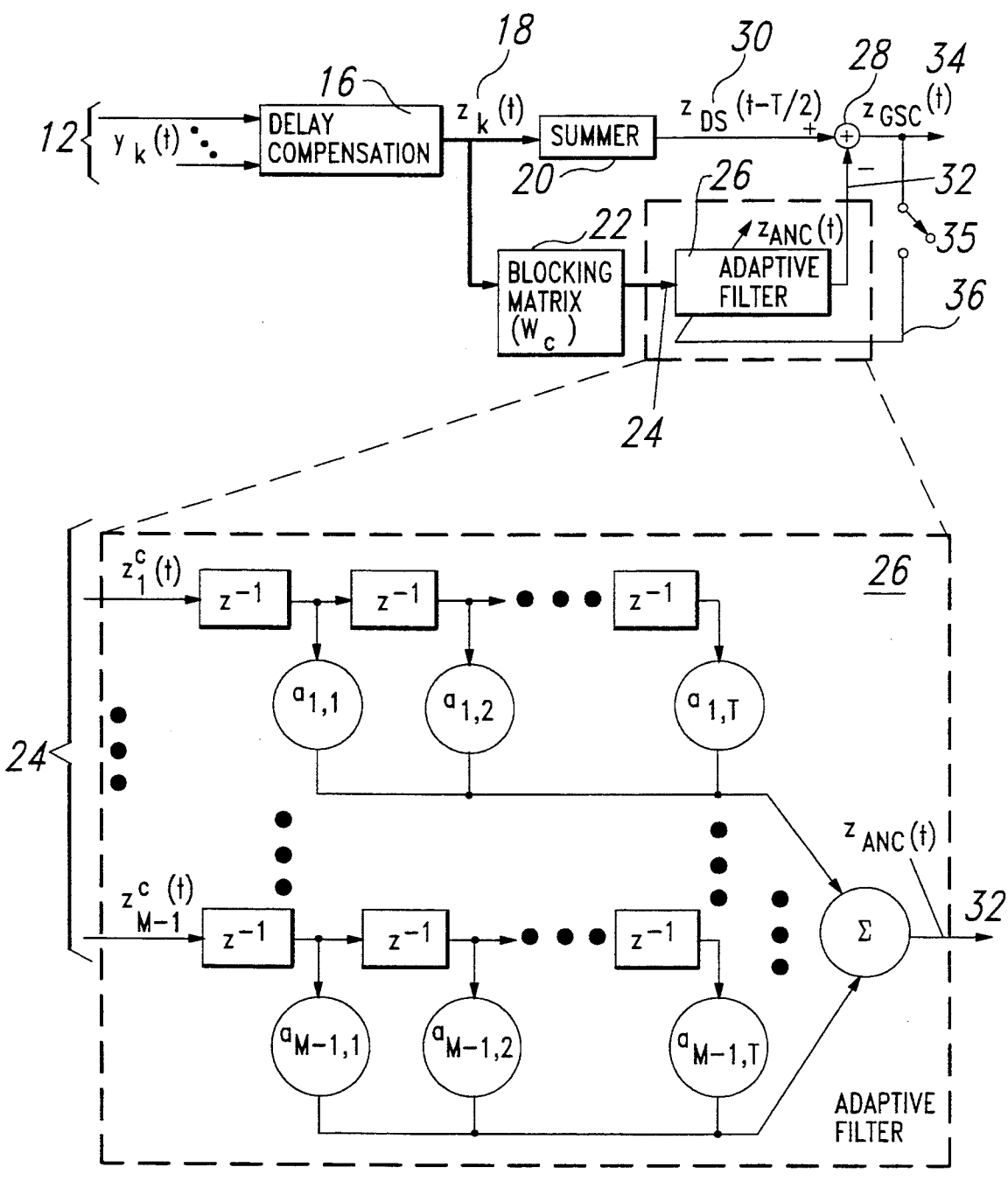
FIG. 2 is a schematic drawing of an adaptive filter for a generalized sidelobe canceler shown in FIG. 1.

However, the SNR gain due to DS-BF 16,18,20 is ordinarily not sufficient for a vehicular application, as only a small number of microphones may be used for practical reasons. For this reason, the use of a generalized sidelobe canceler ("GSC") 14 is preferred. GSC 14 is an adaptive beamformer consisting of three parts, as shown in FIG. 2: conventional DS-BF 16,18,20, adaptive noise canceler ("ANC") 22,24,26, and adder 28 that produces an overall GSC output 34.

Because target signals 18 of all channels 12 are synchronized after delay compensation 16, signals containing essentially only noises are obtained at ANC 22,24,26 by subtracting one channel from another. Thus, blocking matrix 22, for example, can consist of "plus ones" and "minus ones" in appropriate places. Noise data from reduced channels 24 is processed through adaptive filter 26 to minimize the power of the output signal 34, which is equivalent to minimizing the noise content of GSC output 34. GSC 14 can therefore provide larger SNR gains than possible from DS-BF 16,18,20 alone.

The output 34 of GSC 14 can be obtained by $$z_{GSC}(t) = z_{DS}(t - T/2) - z_{ANC}(t)$$

where the delay term T/2 in the argument of DS-BF output corresponds to the delay introduced by the ANC adaptive filter 26; $z_{ANC}(t)$ is the noise canceling component; and $$z_{ANC}(t) = \sum_{i=1}^{M'} \sum_{j=1}^{T} a_{i,j}(t) z_i^c(t-j)$$

$$z_i^c(t) = \sum_{k=1}^{M} w_{k,i}^c z_k(t) \quad i = 1, \ldots, M'$$

$$W_c = [W_{i,j}^c] \, i = 1, \ldots M \, j = 1, \ldots, M'$$

with T being the number of taps or coefficients of each of the M' adaptive filters $a_{ij}(t)$. Note that $W_c$ is an example blocking matrix 22 and its dimension M' can be determined by selecting $$W_c = \begin{bmatrix} 1 & & & & 0 \\ -1 & 1 & & & \\ & -1 & & & \\ & & \cdot & & \\ & & & \cdot & 1 \\ 0 & & & & -1 \end{bmatrix}$$

when $M' = M - 1$. Adaptive filter 26 coefficient $a_{ij}(t)$ is computed by an iterative method as $$a_{i,j}(t) = a_{i,j}(t-1) + z_{GSC}(t-1) z_i^c(t-j)$$

GSC 14 as described above, however, has a major drawback. If the target signals are not completely blocked out at adaptive filter input 24 (thereby causing target "signal leakage"), adaptive filter 26 will then adapt to the characteristics of the target signal; this results in partial cancellation of the target signal. Also, adaptive filter 26 may modify the spectral characteristics of output speech signal 34, which is undesirable for speech applications 40,44,60.

The GSC beamformer 14 is implemented in the present invention for a near-field and wide-band signal (i.e., speech). If the minimum distance between the speaker and microphones 10 is greater than twice the total array aperture, it is reasonable to assume the far-field condition. Actual measurements in a compact-size car, however, support only a near-field condition. For handling the near-field condition, it is assumed that the acoustic signal amplitude attenuates proportionately with distance ("spherical spreading"). Difference signals 24 in the lower branch in FIG. 1 are computed after compensating for the attenuation over the respective target-to-sensor distance. This method reduces the signal leakage mentioned above. Summer 20 at the upper branch in FIG. 1 is, however, implemented without such compensation, so as not to magnify the influence of noise transduced by microphones 10 farther from the speaker.

To overcome the signal leakage problem, an embodiment of the present invention employs an effective adapt-and-stop method in GSC 14: adaptive filter 26 adaptation ("adapt") occurs over a certain period of time, shown in FIG. 3 as portion "A", when only noise is present; adaptive filter 26 is then held fixed ("stop") after this initial adaptation period, designated as portion "B" in FIG. 3, when both speech and noise are present. This modification of GSC 14 is based on two assumptions: 1) noise characteristics are not changing over a certain limited period of time and 2) adaptive filter 26 can be trained ("adapted") over a short period of time (typically less than 5 seconds). Such modification is found to improve the SNR effectively without introducing any serious signal cancellation or spectral distortion. Also, the modified GSC of the present invention is computationally more efficient because it does not adapt the filter coefficients during speech recognition for voice dialing or during speech coding for voice communication. Overall, the performance of this modified GSC 14 is relatively stable, robust, and produces substantially lower recognition error rates than does a single microphone.

One way of implementing the adapt-and-stop strategy of the present invention for cellular telecommunication applications is to require the driver/speaker to push a button or flip a toggle switch (located, for example, on the steering column) indicating his intention to use the phone. This action triggers the ANC filter adaptation; after a few seconds, the adaptation stops and a green light (or some other indicator) signals the driver to start voice dialing.

Figure 4:
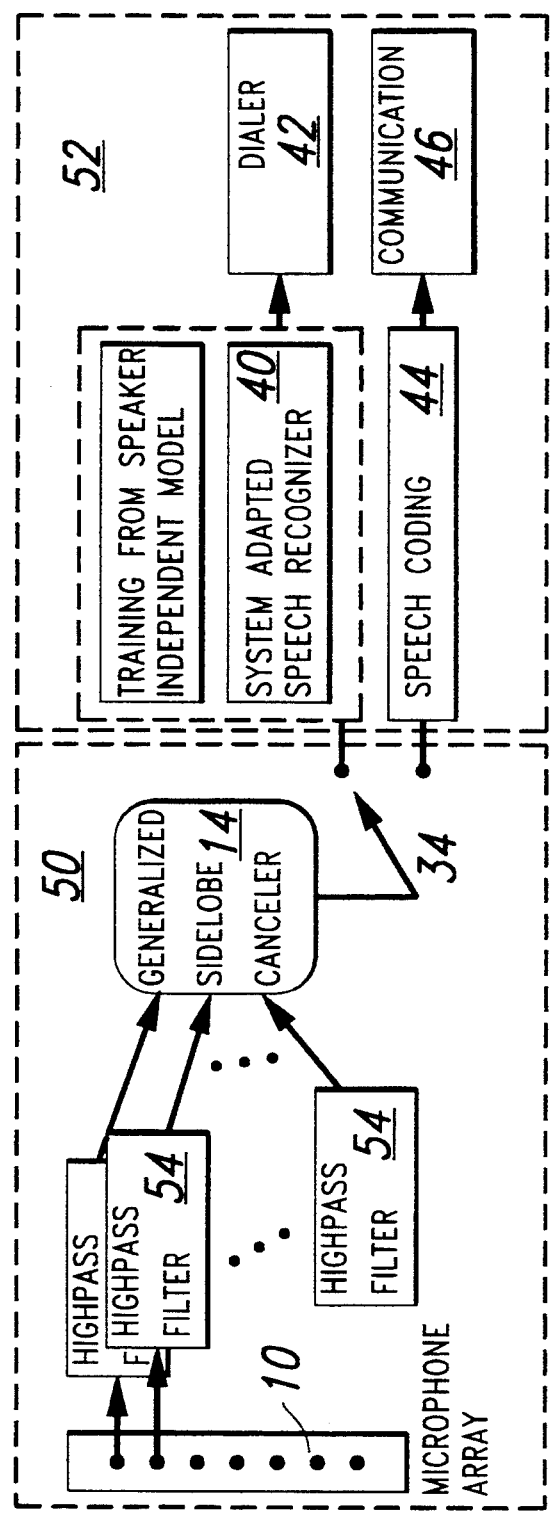
FIG. 4 is a schematic drawing depicting another embodiment of the present invention.

Looking now at FIG. 4, processed target output signal 34 from speech acquisition system 50 is then provided to speech application 52. As seen, speech application 52 may consist of either speech coding mechanism 44 for coding and forwarding to communication link 46, or speech recognition system 38 containing training aspects 60 and speech recognizer 40 for voice recognition and forwarding to voice dialer 42, or both. It should be understood at this point that voice dialer 42 may respond to either spoken digits or a spoken phrase such as "Call Home".

Such adapt-and-stop modification in GSC 14 can be implemented as shown in FIG. 2. Enable/disable circuit switch 35 is toggled whenever adaptive filter 26 is to be trained or fixed, respectively.

In a preferred embodiment, speech recognition system 38 is adaptable to the various aspects of the present speech acquisition system. For example, a speaker-independent speech recognition algorithm developed using a single-microphone-based speech database may be adapted to the use of multiple microphones, beamformer processing, background noise in the automobile, and the speech characteristics of the particular user (driver) of the system. Thus, a desired speech recognition algorithm is trained on a specific talker (so it will be speaker dependent) as well as on specific environment of automobile (e.g., noise characteristics of reverberations, road noises). An example of a speech recognition algorithm which could be so adapted is disclosed in co-pending patent application Ser. No. 07/458,860 by G. Doddington, et al. entitled "Grammar-Based Checksum constraints for High Performance Speech Recognition Circuit". An algorithm used by one embodiment of the present invention is a speaker-independent continuous digit recognition algorithm using the Hidden Markov Model (H1VIM), trained on speech data collected over long-distance telephone lines. It should be understood that such speech recognition could also be speaker dependent.

While it may make sense in a cellular phone application to use a speaker-dependent speech recognition system for expected higher performance and secure access, for consumer acceptance, however, the required training must be short. A practical solution is to use a speaker-independent algorithm and train (or adapt) the observation probabilities of the HMM model with a very limited number of training utterances collected from the given user. This training paradigm is sometimes referred to as "speaker adaptation." When the speaker-independent algorithm was trained on data collected over long-distance telephone lines, the observation probabilities should be adapted to account for the variations in such factors as the transducer (microphone array 10 plus beamforming 14) and background noise, as well as to correspond to the given speaker. This adaptation of a speech recognition algorithm is referred to as "system adaptation" and results in substantial gains in the recognition performance.

Output 34 from speech acquisition system 50 may also be applied to speech coder 44. This is important because digital cellular systems use speech coding. In an implementation of the present invention the US Federal Standard 1016 4.8 kbits/s CELP (Code Excited Linear Prediction) algorithm speech coder was selected. Informal listening tests showed that the speech quality of the CELP coder output was better for GSC than for DS-BF and single microphone cases. Specific speech quality improvements due to GSC 14 include lower background noise level and more natural-sounding voice; the CELP output speech sounds rough for the DS-BF or single microphone cases.

Returning now to FIG. 4, a schematic drawing of another embodiment of the present invention is set forth. Highpass filters 54 are applied to transduced data of each channel 12 to attenuate the data below a cutoff frequency of about 500 Hz. Spectrograms of speech data collected in local and highway driving conditions show the presence of strong low-frequency noise components below about 500 Hz. These noise components result from such factors as mechanical vibrations of a moving car and road noises. Moreover, most communication systems (such as a telephone network) do not carry information below 300 Hz. Applying highpass filters 54 at 500 Hz does not hurt the performance of system adapted speech recognition 40 or speech coding 44. Rather, since it cancels most of the noise due to an automobile's movement, it increases the recognition performance. An alternative implementation is to instead place highpass filter 54 at output 34 of GSC 14, but performance tends not to be as good. Furthermore, in implementation, highpass filter 54 may be combined with an anti-aliasing low pass filter.

Empirical Information.

A hardware system inside a car was developed for speech data acquisition according to the present invention. This system included seven equally spaced omnidirectional microphones (5 cm apart) in a linear array and one head-mounted close-talking microphone, an eight-channel Sony DAT (Digital Audio Tape) recorder, and an interface between the Sony DAT recorder and a Sun SPARCstation for transferring digitized multichannel data. All collected data were processed on the SPARCstation. A DAT recorder was chosen for data acquisition because of its portability.

It should be understood that the present invention should not be limited to the hardware set forth above. For example, more or less microphones could be used in implementing the present invention, with the spacing therebetween established as desired. The spacing for this particular implementation was determined based on the maximum frequency of speech, although other frequency selections could be made, which would in turn affect the microphone spacing. Further, after employing the omnidirectional microphones, it was found better performance was achieved when unidirectional microphones were used instead.

Data was collected inside a compact-size car (Dodge Spirit) using the DATbased speech acquisition system according to the teaching of the present invention. Details of the pilot experiment are: 12 kHz data sampling rate per channel; one male talker; 60 utterances per condition; three idling-car conditions and two driving conditions. As speech utterances, sixty randomly generated 10-digit numbers were used to imitate actual phone numbers. The three idling conditions used are: window closed and fan off (w0f0); window closed and fan on (w0f1); and window open and fan off (w1f0). For the w1f0 condition, the car was parked right near a freeway and was exposed to a high noise level. Most people would consider this condition annoying, although such could be the situation if one were in an accident or required some sort of assistance while on the highway. The two driving conditions used were highway driving at 55 MPH and local driving. The local driving condition included stops at signal lights, acceleration, braking and turning. The digitized data was transferred to the SPARCstation, where it was downsampled to 8 kHz.

The data collected was processed using the two beamforming algorithms, DS-BF and GSC, for each of the five conditions. SNRs were computed for the center microphone in the array, for DS-BF output, and for GSC output. Both single microphone and DS-BF cases produce equivalent SNRs ranging from −2 dB to 12 dB; GSC provides SNR gains ranging from 2 dB to 9 dB over SNR gains generated by a single microphone.

The performance of the speaker-independent case (SI) was compared with the performance of the system-adapted case (SA). Recall that system adaptation requires the driver to provide a small amount of training speech in the car. Ideally, the system adaptation yields the best performance gain when the training speech is collected in the same condition as that used for testing. However, this tends not to be feasible in practice. For a number of reasons including safety and user acceptance, this training is best performed in an idling condition (i.e., in a parked car).

During initial tests, 20 utterances collected in the w0f0 condition were used for system adaptation. In recognition testing for the system-adapted case, we used the remaining 40 utterances for w0f0 and all 60 utterances for each of the remaining conditions. For example, the recognition error rates for SI and SA are given in Table 1 for single microphone, DS-BF and GSC, under each of the three idling-car conditions. Since system adaptation demonstrated superior recognition performance, it was included as a standard feature in all subsequent tests.

TABLE 1

Performance comparison between speaker independent and system adapted speech recognition (Error rates in percent)

| Sensor | w0f0 | | w0f1 | | w1f0 | |
|---|---|---|---|---|---|---|
| System | SI | SA | SI | SA | SI | SA |
| One Mike | 26.5 | 0.6 | 52.0 | 2.3 | 64.7 | 60.4 |
| DS-BF | 23.8 | 0.2 | 58.3 | 0.8 | 58.3 | 23.1 |
| GSC | 7.3 | 0.2 | 10.2 | 0.5 | 19.5 | 11.8 |

Speech recognition tests on data collected in a real car according to teachings of the present system, under several noise conditions showed that the adaptive beamformer based GSC system yielded robust performance over all tested conditions. In contrast, both a single microphone and the non-adaptive delay-and-sum beamformer produced, in general, inferior performance and exhibited relatively large swings in performance over different conditions.

Looking next at FIG. 5, a flowchart of another embodiment for improved speech acquisition during hands-free cellular telephone according to the present invention is set forth. In the preferred embodiment, the system is adapted. First the adaptive filter is trained for a predetermined time (100) and then held fixed for the spoken input (110) as described previously. Next spoken signals containing speech and noise aspects are detected (120). As described above, it is preferred that a linear array of sensors is used for such detection. The channels of input from each sensor are then filtered with a highpass filter to remove the lower frequencies (130). A beamformer then processes the filtered signals (140). The beamformer contains an adaptive filter with enable/disable circuitry, as discussed above, for selectively adapting said filter for a predetermined period of time. A speech application system then recognizes (150) the speech aspects of such processed signal and responds thereto (160).

It should be understood that various embodiments of the invention can employ or be embodied in hardware, software or microcoded firmware. Process diagrams are also representative of flow diagrams for microcoded and software based embodiments. Furthermore, while a specific embodiment of the invention has been shown and described, various modifications and alternate embodiments will occur to those skilled in the art. Accordingly, it is intended that the invention be limited only in terms of the appended claims.

I claim:

1. A system for an improved acquisition of speech comprising:

a plurality of linearly arrayed sensors to detect spoken input and to output signals in response thereto;

a highpass filter to filter a preselected first noise portion from said signals received from said linearly arrayed sensors;

a beamformer, connected to said highpass filter, to cancel a preselected second noise portion from said filtered signals thereby producing a processed signal; and a speech application system, connected to receive said processed signal from said beamformer, for receiving and responding to said processed signal, wherein said beamformer is a generalized sidelobe canceler, comprising a delay and sum beamformer, an adaptive noise canceler and an adder which produces said processed signal, and wherein said adaptive noise canceler comprises a blocking matrix, an adaptive filter and an adder, and wherein said adaptive filter comprises enable/disable circuitry for selectively adapting said adaptive filter for a predetermined period of time.

2. A system for an improved acquisition of speech comprising:
- a plurality of linearly arrayed sensors to detect spoken input and to output signals in response thereto;
- a highpass filter to filter a preselected first noise portion from said signals received from said linearly arrayed sensors;
- a beamformer, connected to said highpass filter, to cancel a preselected second noise portion from said filtered signals thereby producing a processed signal; and
- a speech application system, connected to receive said processed signal from said beamformer, for receiving and responding to said processed signal, wherein said speech application system is a speech coder with a communications link.

3. A system for an improved acquisition of speech comprising:
- a plurality of linearly arrayed sensors to detect spoken input and to output signals in response thereto;
- a highpass filter to filter a preselected first noise portion from said signals received from said linearly arrayed sensors;
- a beamformer, connected to said highpass filter, to cancel a preselected second noise portion from said filtered signals thereby producing a processed signal; and
- a speech application system, connected to receive said processed signal from said beamformer, for receiving and responding to said processed signal, wherein said speech application system is a speech recognition system.

4. The system of claim 3, wherein said speech recognition system includes a speaker recognition algorithm which is adaptable by a predetermined amount of training by a speaker.

5. The system of claim 4, wherein said speaker recognition algorithm is speaker independent.

6. The system of claim 3, wherein said speech recognition system uses a Hidden Markov model speech recognition algorithm.

7. A system for improved acquisition of speech, comprising of:
- a plurality of linearly arrayed sensors to detect spoken input and to output signals in response thereto;
- a beamformer, connected to said linearly arrayed sensors, to cancel a preselected noise portion of said signals thereby producing a processed signal, said beamformer including an adaptive noise canceler and an adder which produces said processed signal; and
- a speech application system, connected to receive said processed signal from said beamformer, for receiving and responding to said processed signal, wherein said adaptive noise canceler comprises a blocking matrix, an adaptive filter and an adder, and wherein said adaptive filter further comprises enable/disable circuitry for selectively adapting said adaptive filter for a predetermined period of time.

8. A system for improved acquisition of speech, comprising of:
- a plurality of linearly arrayed sensors to detect spoken input and to output signals in response thereto;
- a beamformer, connected to said linearly arrayed sensors, to cancel a preselected noise portion of said signals thereby producing a processed signal, said beamformer including an adaptive noise canceler and an adder which produces said processed signal; and
- a speech application system, connected to receive said processed signal from said beamformer, for receiving and responding to said processed signal, wherein said speech application system includes a speech coder and a communications link.

9. A system for improved acquisition of speech, comprising of:
- a plurality of linearly arrayed sensors to detect spoken input and to output signals in response thereto;
- a beamformer, connected to said linearly arrayed sensors, to cancel a preselected noise portion of said signals thereby producing a processed signal, said beamformer including an adaptive noise canceler and an adder which produces said processed signal; and
- a speech application system, connected to receive said processed signal from said beamformer, for receiving and responding to said processed signal, wherein said speech application system is a speech recognition system.

10. The system of claim 9, wherein said speech recognition system includes a speaker recognition algorithm which is adaptable by a predetermined amount of training by a speaker.

11. The system of claim 10, wherein said speaker recognition algorithm is speaker independent.

12. The system of claim 9, wherein said speech recognition system uses a Hidden Markov Model speech recognition algorithm.

13. A system for improved acquisition of speech, comprising:
- a plurality of linearly arrayed sensors to detect spoken input and to output signals in response thereto;
- a beamformer, connected to said linearly arrayed sensors, to cancel a preselected noise portion of said signals thereby producing a processed signal; and
- a speech recognition system, connected to receive said processed signal from said beamformer, for receiving and responding to said processed signal, said speech recognition system including a speaker recognition algorithm which is adaptable by a predetermined amount of training by a speaker.

14. They system of claim 13, wherein said system further comprises a highpass filter connected to said beamformer to filter a preselected noise portion of said signals received from said linearly arrayed sensors before transmitting such filtered signals to said beamformer.

15. The system of claim 13, wherein said beamformer is a generalized sidelobe canceler, comprising a delay and sum beamformer, an adaptive noise canceler and an adder which produces said processed signal.

16. The system of claim 15, wherein said adaptive noise canceler comprises a blocking matrix, an adaptive filter and an adder.

17. The system of claim 16, wherein said adaptive filter further comprises enble/disable circuitry for selectively adapting said adaptive filter for a predetermined period of time.

18. The system of claim 13, wherein said speech recognition system uses a Hidden Markov Model speech recognition algorithm.

19. A method for improved acquisition of speech during hands-free cellular telephony, comprising the steps of:
   detecting spoken signals, including a speech portion and a noise portion, with linearly arrayed sensors;
   filtering a preselected portion of said noise portion of said signals by a highpass filter;
   processing said filtered signals with a beamformer including an adaptive filter and enable/disable circuitry for selectively adapting said adaptive filter for a predetermined period of time;
   recognize said speech portion; and
   responding to said processed signal.

20. The method of claim 19, wherein said step of responding to said processed signal includes the step of dialing a number associated with said speech portion.

21. The method of claim 19, wherein said step of recognizing said speech portion further includes the step of employing a Hidden Markov Model speech recognition algorithm to aid in recognizing such speech portion.

22. The method of claim 19, wherein the method further comprises the step of adapting an adaptive filter for a predetermined period of time and the step of stopping said adaptation of said adaptive filter after said step of detecting step.

* * * * *